United States Patent [19]
Gat et al.

[11] Patent Number: 5,774,582
[45] Date of Patent: Jun. 30, 1998

[54] HANDWRITING RECOGNIZER WITH ESTIMATION OF REFERENCE LINES

[75] Inventors: Yoram Gat, Haifa; Arie Kadosh, Netanya, both of Israel

[73] Assignee: Advanced Recognition Technologies, Inc., Menlo Park, Calif.

[21] Appl. No.: 428,806

[22] Filed: Apr. 24, 1995

[30] Foreign Application Priority Data

Jan. 23, 1995 [IL] Israel ........................................ 112420

[51] Int. Cl.$^6$ .............................. G06K 9/00; G06K 9/34
[52] U.S. Cl. .......................... 382/186; 382/187; 382/177
[58] Field of Search .................................. 382/184, 186, 382/187, 188, 189, 177, 178, 179, 174; 395/792

[56] References Cited

U.S. PATENT DOCUMENTS

| | | | |
|---|---|---|---|
| 4,024,500 | 5/1977 | Herbst et al. | 340/146.3 SG |
| 4,845,768 | 7/1989 | Kochert | 382/174 |
| 4,972,496 | 11/1990 | Sklarew | 382/187 |
| 5,001,765 | 3/1991 | Jeanty | 382/187 |
| 5,111,514 | 5/1992 | Ohta | 382/177 |
| 5,138,668 | 8/1992 | Abe | 382/177 |
| 5,396,566 | 3/1995 | Bruce | 382/187 |
| 5,590,257 | 12/1996 | Forcier | 395/792 |
| 5,613,019 | 3/1997 | Altman | 382/189 |
| 5,633,957 | 5/1997 | Robinson | 382/179 |

OTHER PUBLICATIONS

Burr, D.J., "A Normalizing Transform For Cursive Script Recognition," Proceedings of the 6th International Conference on Pattern Recognition, IEEE Press, 1982, pp. 1027–1030.

Singer, Y. and Tishby, N., "Dynamical Encoding of Cursive Handwriting," Biological Cybernetics, Springer-Verlag Publishing, 1994, pp. 1–11.

*Primary Examiner*—Dwayne Bost
*Assistant Examiner*—Brian L. Johnson
*Attorney, Agent, or Firm*—Skjerven, Morrill, MacPherson, Franklin & Friel

[57] ABSTRACT

The system of the present invention has a reference character database, which stores a multiplicity of reference characters, and a feature extractor which extracts shape information for each input character. For each reference character, the database lists shape information and reference line measurements indicating how reference lines pass through it. For example, the reference line measurements can be percentages of a height of a bounding box which bounds each reference and/or input character.

In some embodiments, the input characters are collected into a stroke buffer and in other embodiments, they are collected into a line buffer. In all embodiments, the reference line estimation is performed for a series of input characters, whether as a full line of characters or as a collection of strokes.

10 Claims, 10 Drawing Sheets

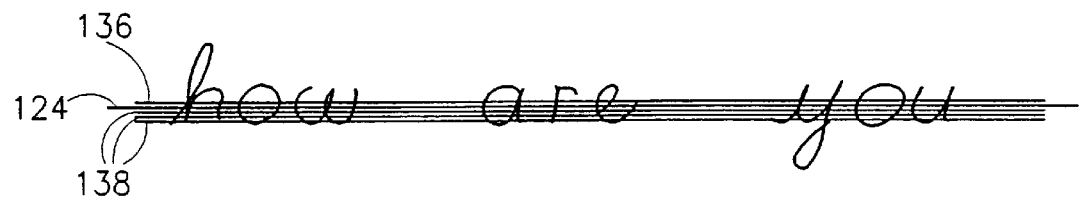
FIG.9B
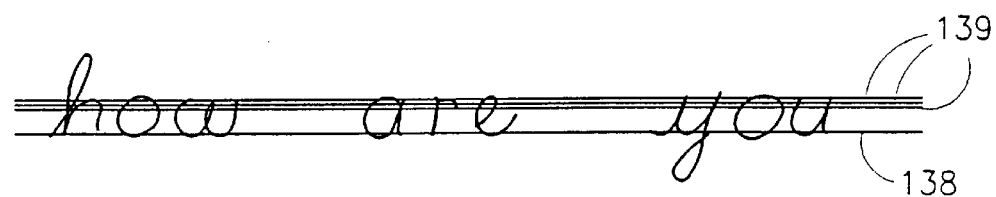
FIG.9C
*how are you*
FIG.11

HANDWRITING RECOGNIZER WITH ESTIMATION OF REFERENCE LINES

FIELD OF THE INVENTION

The present invention relates to handwriting recognition systems generally and to base- and size-line recognizers in particular.

BACKGROUND OF THE INVENTION

English letters are defined with reference to four, imaginary, lines, the base-line along which the bottoms of most letters lie, the size-line defining the top of small letters, the upper-line defining the top of capital and tall letters, such as h and d, and the lower-line defining the bottom of the letters, such as g and y, which extend below the base-line. These lines are utilized for both printed and handwritten letters.

FIG. 1 provides a sample of some handwritten letters (e.g. the question "how are you?"), with the reference lines marked. It is noted that all of the letters lie on the baseline, labeled 10, and most of the smaller letters ("o,w,a,r,e,u") reach to the size-line 12. The ascender portion of letters, such as of the letter "h", extends to the over-line 14 and the descender portion of letters, such as the loop of the "y", extends to the under-line 16. The lines 10–16 define three zones, a middle zone 20 between the size- and base-lines 10 and 12, an over zone 22 (from the size-line 12 to the upper-line 14) and an under zone 24 (from the base-line 10 to the lower-line 16).

The reference lines 10–16 are the lines utilized to teach a child to write alphanumeric characters, whether as cursive script or as separate letters. When these lines are not actually present, as in free writing, the writer imagines them in order to maintain the visual line structure.

For computer handwriting recognition systems, the reference lines 10–16 are important since certain classes of letters are extremely similar except for their location with reference to the reference lines 10–16. For example, characters whose lower- and uppercase shape are basically the same, such as "c" and "C", and "o" and "O". Other characters, such as "9", "q" and "g", and "z" and "3", when handwritten, can only be easily differentiated by their location vis-a-vis the reference lines. Many handwriting styles produce the following letters in similar shapes: "e" and "l", "h" and "n", etc. Thus, by knowing where the reference lines are, many ambiguities in recognition can be solved.

For some handwriting recognition systems, the input element, typically a tablet with an associated stylus, has the reference lines marked thereon and the user is required to write within the marked lines. This, however, is difficult on the user since his handwriting style may have significantly different reference lines than those marked on the tablet. Therefore, it is desirable to allow completely free writing, but be able to reconstruct the reference lines.

In the paper entitled "A Normalizing Transformation for Cursive Script Recognition", Burr, D. J. *Proceedings of the 6th International Conference on Pattern Recognition*, IEEE Press, 1982, pp. 1027–1030, Burr introduces a mechanism to compensate for slant and size irregularities. He projects the y-coordinate of the sample points of each word onto an X-axis (a horizontal axis), thereby forming a histogram. From the histogram, he determines where the middle zone is. Unfortunately, the histogram values change significantly with different writing styles and thus, affects the base- and size-line estimation.

U.S. Pat. No. 4,024,500 (to Herbst et al.) describes a segmentation method which segments characters at the points where the stylus velocity, in either the Y (vertical) or X (horizontal) direction, is zero. The system of U.S. Pat. No. 4,024,500 defines the base-line and the middle zone by taking a moving weighted average of the zero velocity values in the X axis. This method is not accurate enough and can lead to misleading interpretations of characters.

The article by Y. Singer and N. Tishbi "Dynamical Encoding of Cursive Handwriting", *Biological Cybernetics*, Springer-Verlag Publishing, 1994, describes a heuristic method of estimating the position of four reference lines and a fifth one in the middle of the middle zone. The method determines the Y-coordinates of zero velocity points. It then defines the lines as being positioned so as to minimize the distance between the lines and the set of zero velocity points.

SUMMARY OF THE PRESENT INVENTION

It is an object of the present invention to provide an improved handwriting recognition system having a reference line estimator.

The present invention provides a plurality of methods and apparatus for estimating reference lines. In all embodiments, the system has a reference character database which stores a multiplicity of reference characters and a feature extractor which extracts shape information for each input character. For each reference character, the database lists shape information and reference line measurements indicating how reference lines pass through it. For example, the reference line measurements can be percentages of a height of a bounding box which bounds each reference and/or input character.

In some embodiments, the input characters are collected into a stroke buffer and in other embodiments, they are collected into a line buffer. In all embodiments, the reference line estimation is performed for a series of input characters, whether as a full line of characters or as a collection of strokes.

In a first embodiment, the reference lines estimator is connected to the line buffer and estimates reference lines utilizing the location of local maxima and local minima in the line of the input characters in the line buffer. For each input character, the feature extractor provides shape information and the reference line estimator provides the location of the reference lines. A character classifier matches the reference characters of the database to the input characters in accordance with the shape information from the feature extractor and in accordance with the reference line measurements as a function of the output of the reference line estimator.

In this first embodiment, the reference lines estimator includes a size- and over-line classifier for determining a size-line and for determining an over-line if the local maxima have a range larger than a threshold. The reference lines estimator can also include a base- and under-line classifier for determining a base-line and for determining an under-line if the local minima have a range larger than a threshold.

In a second embodiment, the reference lines estimator receives a line of input characters from the stroke buffer and produces a plurality of possible reference lines all of which are parallel to a "central" line which is the best approximation of a line through the central sample points of the strokes. The character classifier produces scores for a line of characters, for each possible combination of two reference lines. The scores indicate the match of the reference characters with the input characters in accordance with the shape information and the combination of the two reference line measurements. A decision unit selects the reference characters having the "best" match.

The reference lines estimator of the second embodiment estimates a central line from a set of central sample points of the strokes, and produces the plurality of possible reference lines as lines parallel to but at a distance the central line.

In a third embodiment, the reference line estimator operates after the reference characters have been matched to the input characters. The reference line estimator only receives the reference characters having the top match scores to the input characters (where top score is defined as being above a certain threshold level) and generates reference lines from the reference line measurements of the selected reference characters. One set of reference lines is produced for each combination of selected reference characters. A decision unit classifies the line of input characters based on the "best" score, for the line, produced by the reference lines estimator.

BRIEF DESCRIPTION OF THE DRAWINGS

The present invention will be understood and appreciated more fully from the following detailed description taken in conjunction with the drawings in which:

FIGS. 9A, 9B and 9C are illustrations useful in understanding the operations of the generator detailed in FIG. 7;

FIG. 11 is an illustration of a handwriting sample useful in understanding the operation of the reference line estimator of FIG. 10.

DETAILED DESCRIPTION OF PREFERRED EMBODIMENTS

Figure 1:
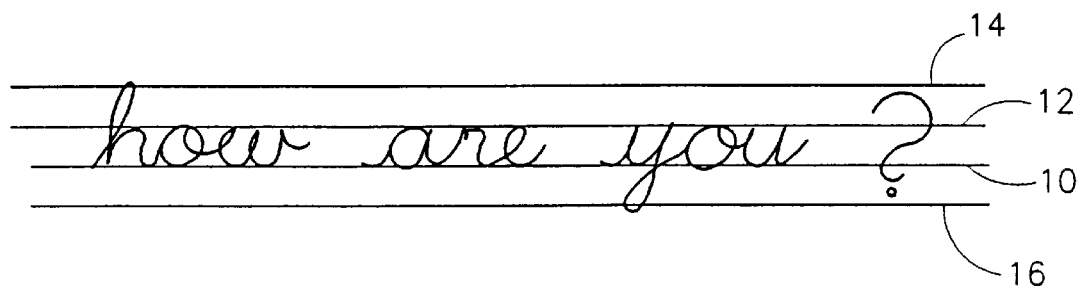
FIG. 1 is a schematic illustration of a handwritten line with the reference lines marked thereon.
Figure 3:
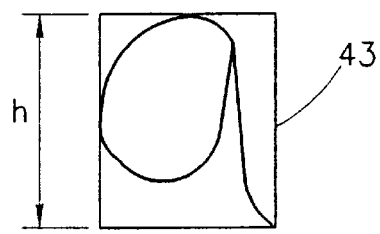
FIG. 3 is a schematic illustration of a reference character within a bounding rectangle, useful in understanding the system of FIG. 2.
Figure 2:
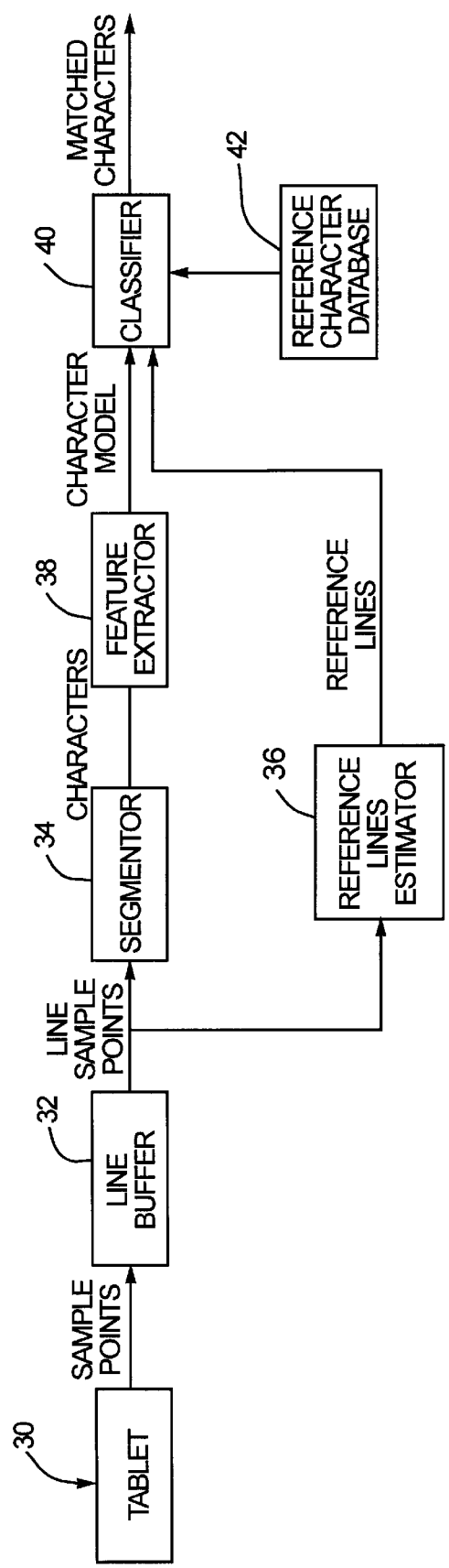
FIG. 2 is a block diagram illustration of a handwriting recognition system having a reference line estimator, constructed and operative in accordance with a preferred embodiment of the present invention.

Reference is now made to FIG. 2 and FIG. 3. FIG. 2 illustrates, in block diagram format, a handwriting recognition system having a reference line estimator, constructed and operative in accordance with a preferred embodiment of the present invention. FIG. 3 illustrates a reference character stored in a reference character database.

The handwriting system comprises an input device 30, such as a tablet and stylus, a line buffer 32, a segmentor 34, a reference line estimator 36, a feature extractor 38, a classifier 40 and a reference character database 42. The input device 30 receives the handwritten characters or patterns and digitizes them, producing sample points. The line buffer 32 receives the sample points and stores them until an "end of line" signal is received, at which point, the sample points for the entire line are released to the segmentor 34 and to the reference lines detector 36.

The segmentor 34 segments the line of sample points into its component characters and the feature extractor 38 extracts the relevant features of each character to produce a model of each character which is provided to the classifier 40. The reference lines detector 36 determines the locations of the reference lines 10–16 and provides this information to the classifier 40.

The input device 30, the segmentor 34 and the feature extractor 38 can be any of the many known in the art.

Classifier 40 utilizes both the character model information and the reference line locations to match the characters received from the input device 30 to those stored in the database 42.

FIG. 3 illustrates an exemplary reference character, a handwritten "a", of the database 42. The character is stored within a bounding rectangle 43.

For each character in the database 42, the following information is stored: the features of the character (as extracted by a feature extractor such as extractor 38), the alphanumeric character to which it refers (the letter "a"), and the location of its reference lines as a percentage of the height h of the bounding rectangle. For the exemplary character of FIG. 3, the base-line is at a height of approximately 0.25 h and the size-line is at a height of approximately 1.0 h.

The classifier 40 typically performs a number of matching operations for each reference character vis-a-vis each input character. In one operation, it matches the extracted features of the input character to the features of each reference character and produces a "shape" score for each reference character. The character matching operation can be any which operates in conjunction with the feature extractor 38. In a second operation, the classifier 40 matches the location of the reference lines of the input character (as functions of the height of the bounding rectangle) to those of the reference characters to produce "base", "size", "overline" and "underline" scores. For each reference character, the classifier 40 produces a combination score and it selects the reference character having the "best" combination score, for some measure of "best".

Figure 4:
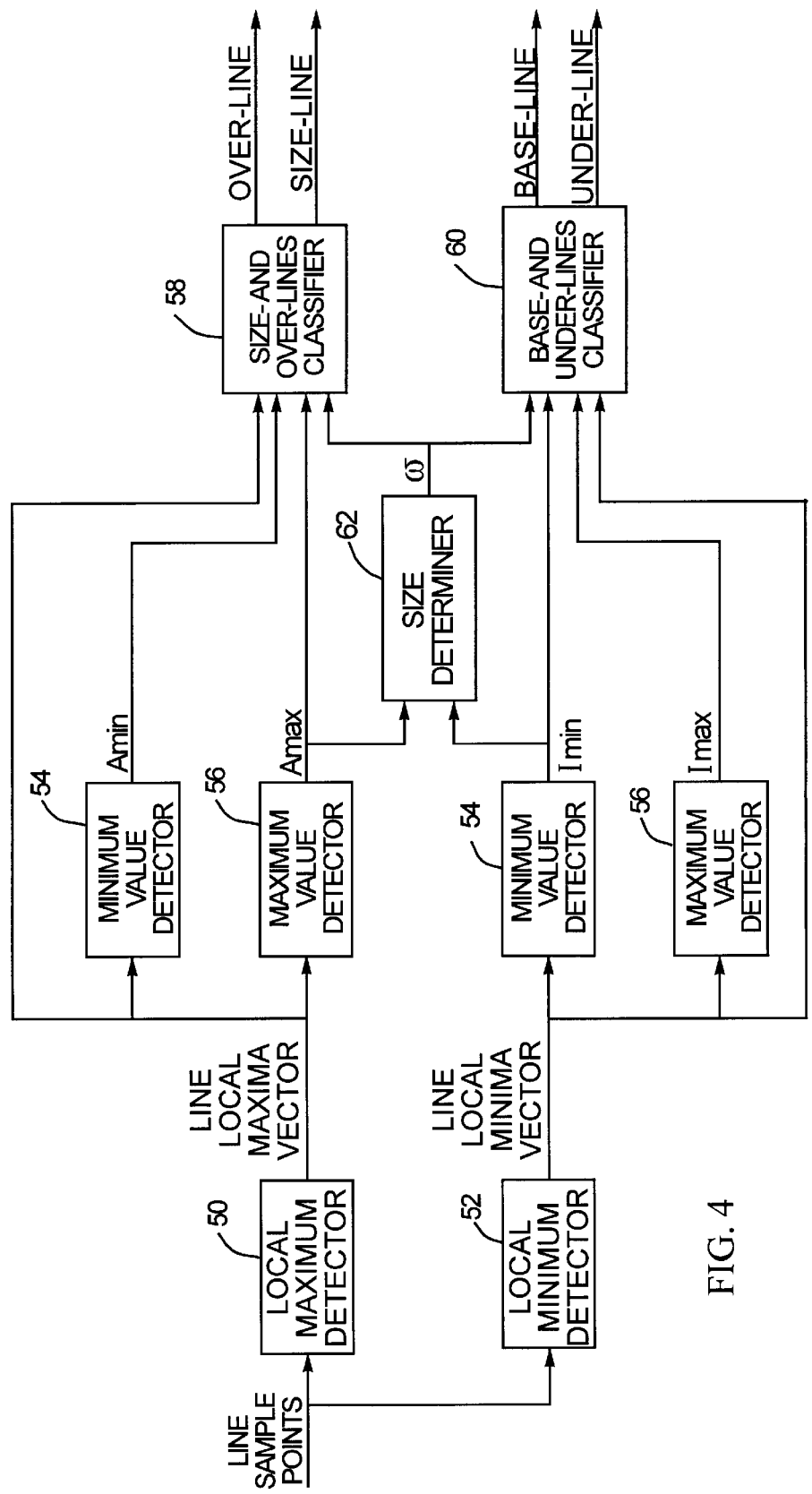
FIG. 4 is a block diagram illustration of a reference line estimator forming part of the system of FIG. 2.
Figure 5A:
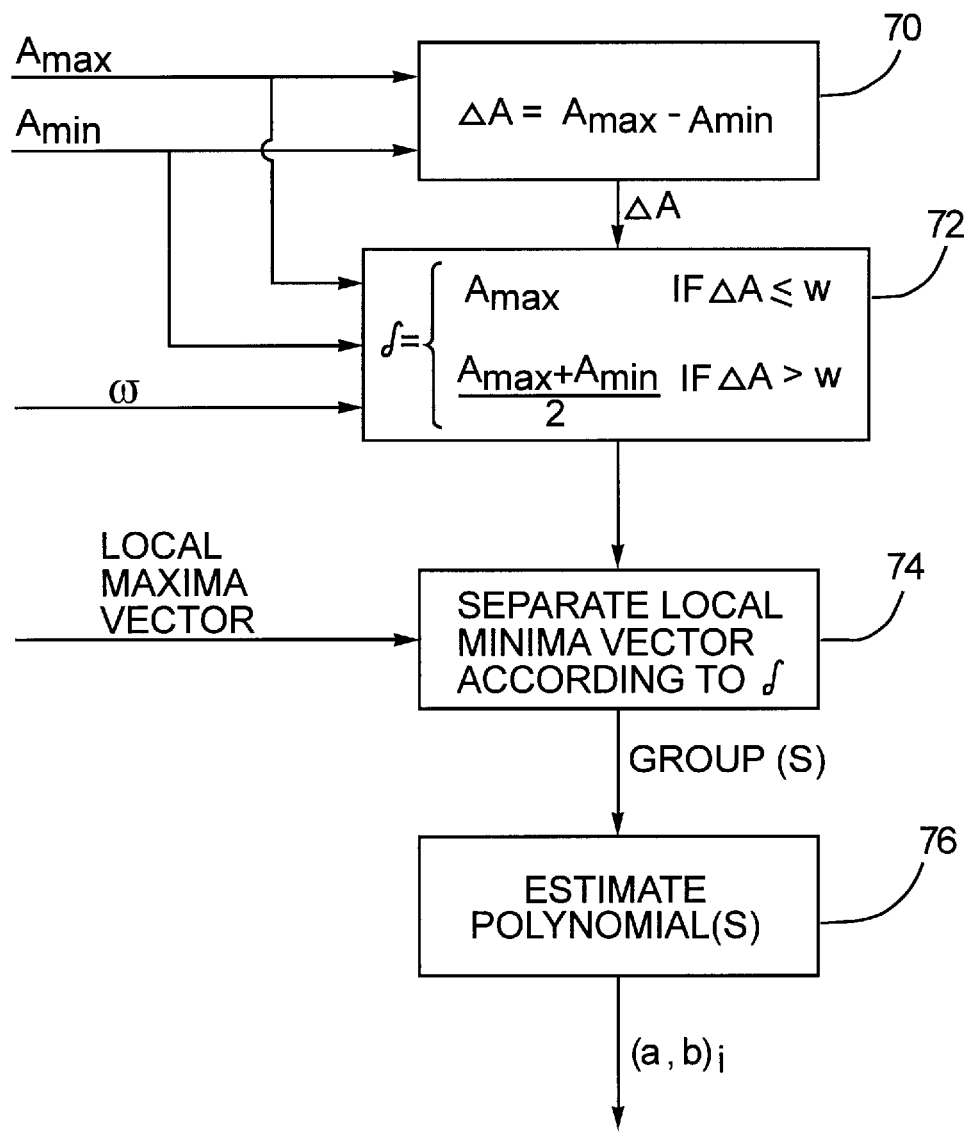
FIGS. 5A and 5B are flow chart illustrations detailing the operations of two line classifiers of the reference line estimator of FIG. 4.
Figure 5B:
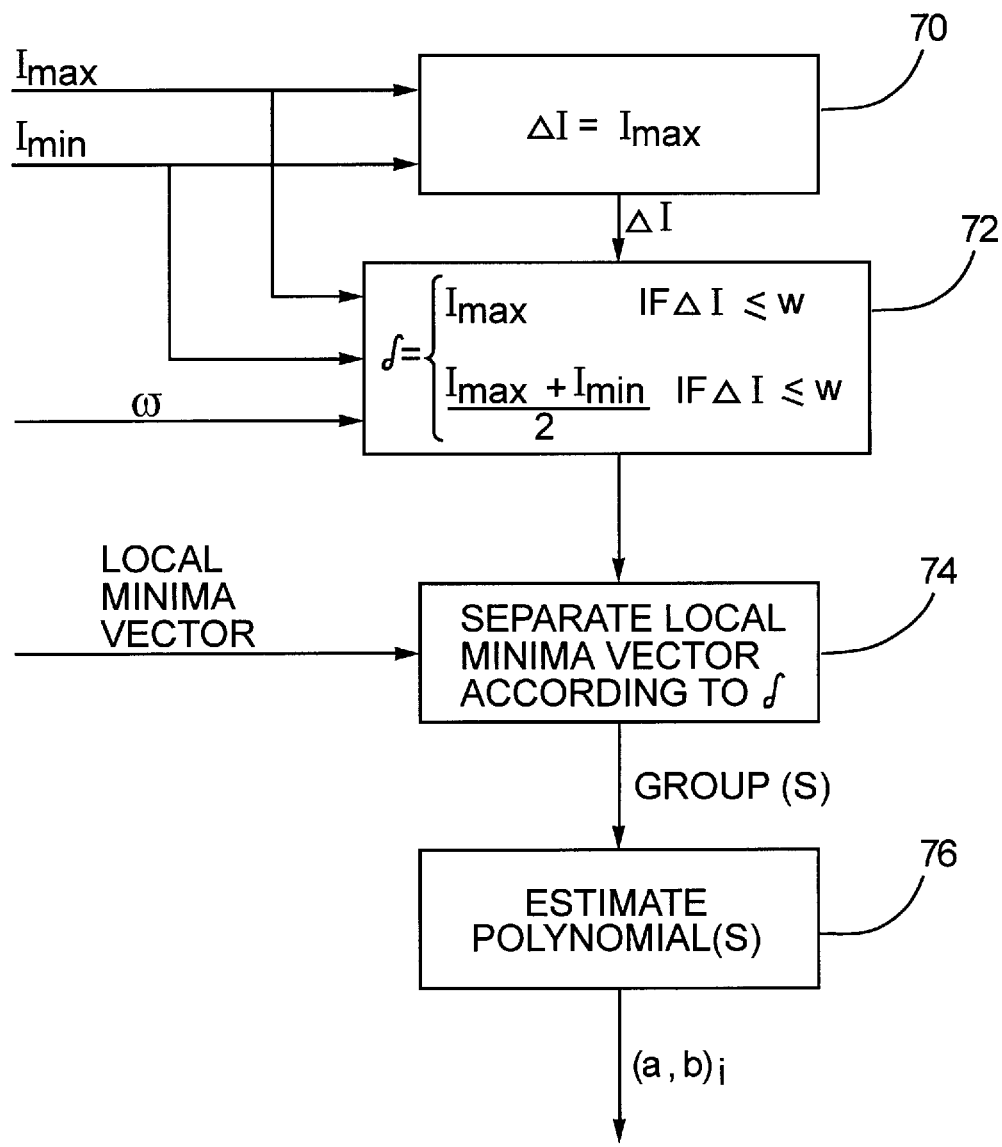

Reference is now made to FIGS. 4, 5A and 5B which illustrate elements of the reference lines detector 36. Detector 36 utilizes the Y-coordinates of local extremum points (points at which the tangent to the curve is parallel to the horizontal (X) axis). The Y-coordinates are divided into sets of local maximum points and local minimum points. The set of local maximum points indicate points which are most likely to form part of either the size or the size- and over-lines and the set of local minimum points indicates points which are likely to form part of the base-line or the base- and under-line. Detector 36 then finds the maximum and minimum elements of each set in order to determine the vertical spread of each group. From the coordinates of these elements, the equations of the possible reference lines are determined, as described in more detail hereinbelow.

Detector 36 comprises local extremum detectors 50 and 52 and two minimum and maximum value detectors 54 and 56, respectively. Local extremum detectors 50 and 52 review the entire line of sample points by sliding a window of a few points, e.g. 9 points, over the line to detect the points at which the slope of the curve is parallel to the horizontal axis (i.e. the slope is approximately zero). Alternatively, detectors 50 and 52 determine whenever the curve changes direction from up to down (local maximum) and from down to up (local minimum). Detector 50 stores the local maxima and detector 52 stores the local minima.

Detectors 50 and 52 output vectors of the positions of local maxima and minima, respectively, found in the entire line. Each vector is processed by one maximum and one minimum value detector 56 and 54, respectively, to select the maximum and minimum value within the set input to them. Thus, the processing of the local maxima vector produces the maximum and minimum values Amax and Amin of the local maxima. Amin and Amax indicate the vertical spread of local maximum values; the spread is useful in identifying the upper two lines (over- and size-lines) of the four reference lines. Similarly, Imax and Imin, produced by detectors 56 and 54 when operating on the local minimum values, indicate the vertical spread of local minima which helps to determine the base- and under-lines.

The values of Amax and Imin, which indicate the full vertical spread of the local extrema, are provided to a size determiner 62. Size determiner 62 determines the maximal width H of the line of characters (the distance between Amax and Imin) and produces therefrom a width measurement W, which is typically a fractional multiple k of the maximal width H, to be utilized as a threshold width level for line classifiers 58 and 60. Typically, k has a value of ⅙.

The values Amax and Amin and the vector of local maxima are provided to a size- and over-line classifier 58. The values Imax and Imin and the vector of local minima are provided to a base- and under-line classifier 60. As detailed in FIG. 5A, the classifier 58 utilizes the threshold width level W to separate the vector of local maxima into ones which belong to the size-line and ones which belong to the over-line. It is noted that it is not always possible to separate the local maxima into two groups. The classifier 58 then determines the equation of the lines which pass through a group or groups of local maxima. Similarly and as detailed in FIG. 5B, classifier 60 separates the local minima and determines the equations of the lines which pass through the group or groups of local minima.

Specifically, classifier 58 determines ΔA (in step 70, FIG. 5A) which is the difference of Amax and Amin. ΔA designates the distribution of the local maxima points. In step 72, a threshold level δ is determined based on the value of ΔA with respect to the threshold width level W. Specifically, $$\delta = \begin{cases} A\max & \Delta A \leq W \\ \dfrac{A\max + A\min}{2} & \Delta A > W \end{cases} \quad (1)$$

In step 74, the system separates the local maxima vector into two groups according to the value of δ, as follows: if δ=Amax, the over-line group is empty and the entire vector belongs to the size-line group. Otherwise, any local maximum whose Y component is less than or equal to δ belongs to the size-line and all other local maxima belong to the over-line group.

In step 76, the size- and over-line groups are provided to an estimator. If a line is to be estimated, the operation is that of median linear line estimation, detailed hereinbelow with respect to FIG. 6, in which the line estimation is based on the median of the points in the group. Median linear line estimation is more robust than the more traditional least squares regression techniques. The estimator produces the coefficients of the polynomial which pass through the size- and over-line groups. If the polynomial is a line, the coefficients estimated are (a,b). More coefficients are estimated if the polynomial is of higher order (i.e. a curve of some shape).

As shown in FIG. 5B, the classifier 60 operates similarly to classifier 58 but separates the local minima into groups based on the values of Imin and Imax.

Figure 6:
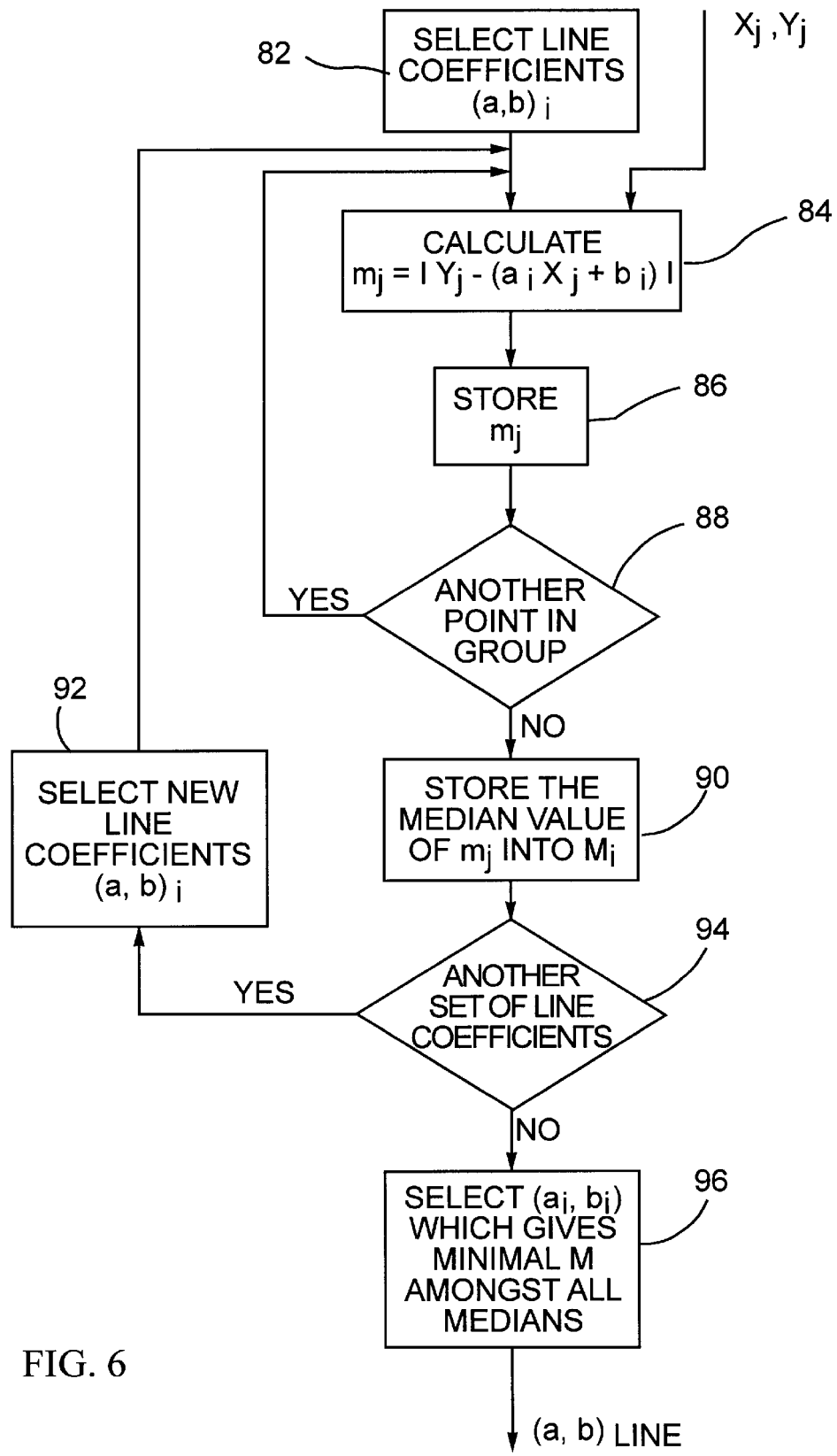
FIG. 6 is a flow chart illustration of a median line estimation method used in the methods of FIGS. 5A and 5B.

Reference is now briefly made to FIG. 6 which details the median linear line estimation method as it operates on one of the size-, base-, over- and under-line groups. In step 82, a first set of coefficients $(a_i, b_i)$ are selected. The difference $m_j$ between the Y-coordinate $Y_j$ of the element of the group (having coordinates $(X_j, Y_j)$ and the approximated value Y' defined as: $Y' = a_i X_j + b_i$ is determined (step 84) and stored (step 86). The process is repeated for each element in the group. In step 90, the median value $M_i$ of the difference values $m_j$ is selected and stored along with the coefficients $(a_i, b_i)$ which produced it.

The process is repeated with another set of coefficients $(a_i, b_i)$ (step 92) as often as desired. Finally, in step 96, the coordinates of the line are selected as those having the lowest median value $M_i$.

Figure 9A:
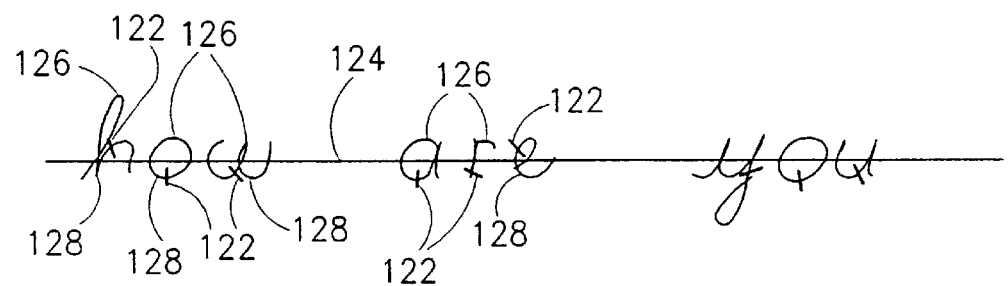
Figure 7:
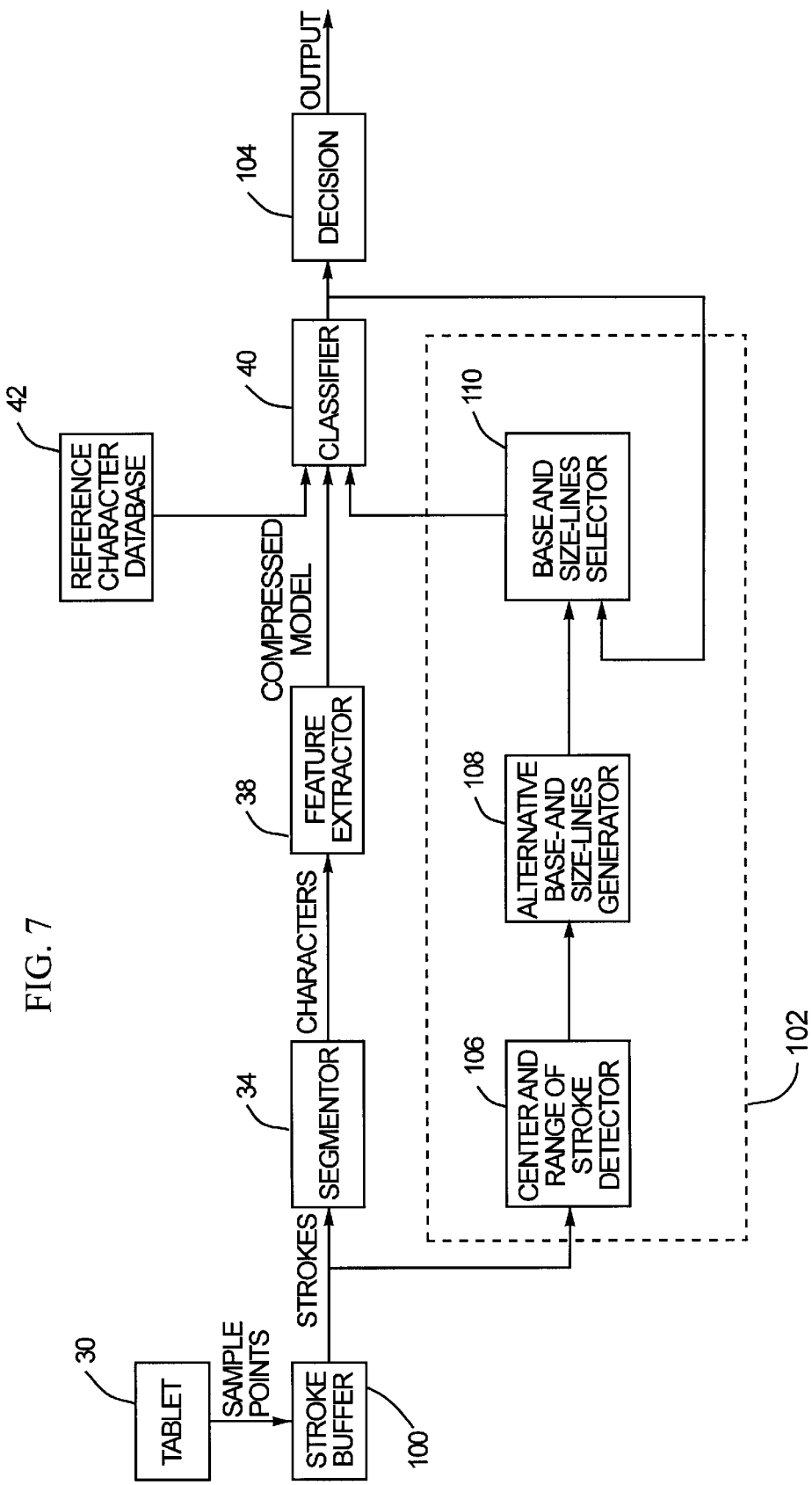
FIG. 7 is a block diagram illustration of a handwriting recognition system having an alternative reference line estimator, constructed and operative in accordance with a second preferred embodiment of the present invention.
Figure 8:
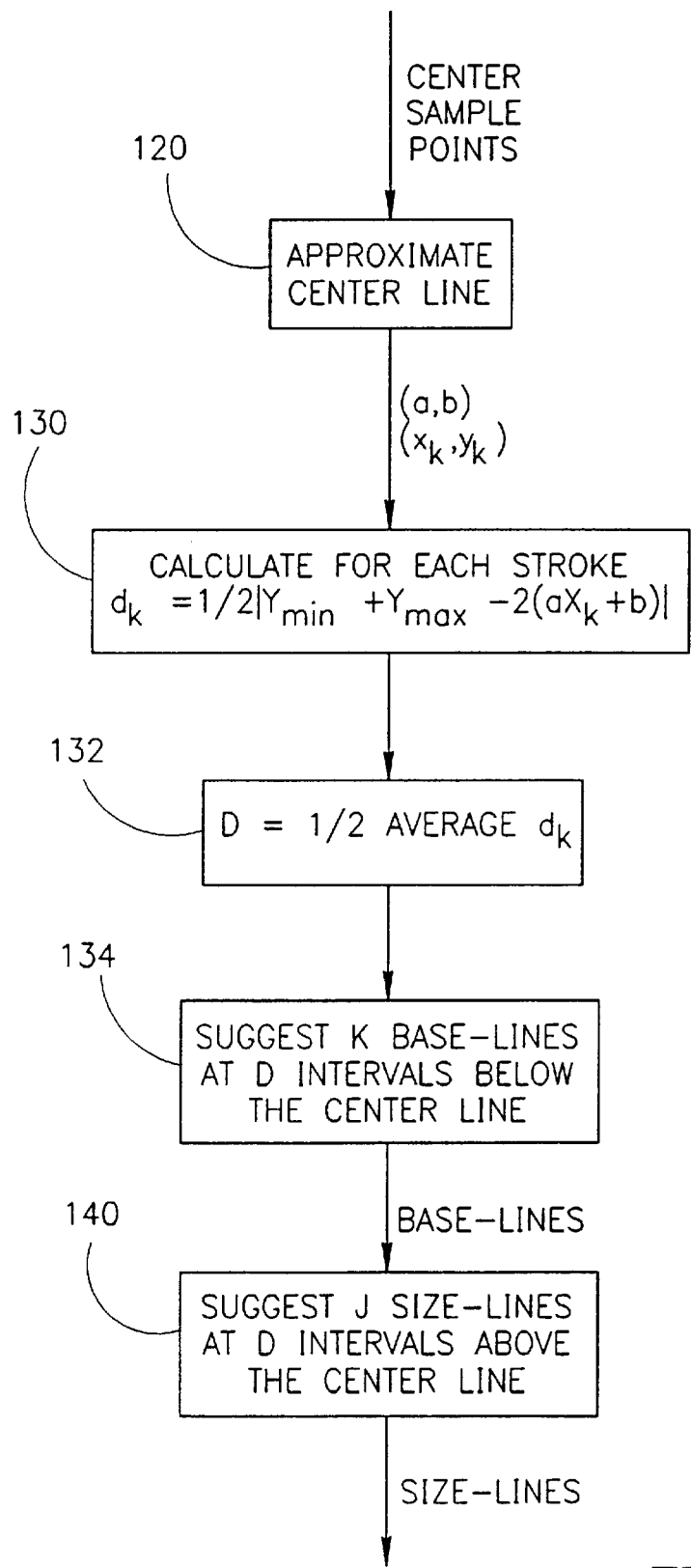
FIG. 8 is a flow chart illustration of the operations of a base- and size-line generator forming part of the system of FIG. 7.

Reference is now to FIG. 7 which illustrates an alternative recognition system having a reference line estimator, to FIG. 8 which details the reference line estimator and to FIGS. 9A, 9B and 9C which are useful in understanding the operation of the reference line estimator.

As in the system of FIG. 2, the handwriting recognition system comprises the tablet 30, the segmentor 34, the feature extractor 38, the reference character database 42 and the classifier 40. However, in this embodiment, the line buffer 32 is replaced by a stroke buffer 100. The present embodiment additionally comprises a reference lines detector 102 and a decision unit 104. The reference lines detector comprises a center and range of stroke detector 106, an alternative base- and size-lines generator 108 and a base- and size-lines selector 110.

Stroke buffer 100 stores the stream of sample points from the tablet 30 as a series of ordered strokes each defined as the series of sample points from pen down to pen up. The strokes of buffer 100 are provided both to the segmentor 34, as in the previous embodiment, and to reference line detector 102. The stroke buffer 100 is typically emptied at the end of a line.

In accordance with the present embodiment, the reference line detector 102 produces a set of possible reference lines (size- and base-lines) for the accumulated strokes currently in the stroke buffer 100. The selector 110 loops over the current set of possible size- and base-lines, for the strokes of the character and the classifier 40 determines match scores for each character currently on the line, with each set of size- and base-lines. The decision unit 104 selects the best match score for each character based on the overall best average match.

Center and range of stroke detector 106 determines the center sample point and the upper and lower position of each stroke. Generator 108 utilizes the center, upper and lower positions to determine alternate locations of base- and size-lines as detailed in FIG. 8.

In step 120, the generator 108 generates a center line, with coefficients (a,b) from the center sample points. Typically, center line estimation utilizes the median linear line estimation method described in FIG. 6 for groups of local extremum. In step 120, the intersection of the center line with each stroke is also determined and the intersection point is denoted by ($X_k$, $Y_k$).

The output of step 120 is illustrated in FIG. 9A which shows a series of strokes "how are you", their stroke center points 122 and the resultant center line 124. FIG. 9A also illustrates the upper points 126 and the lower points 128 of some of the strokes. It is noted that the center point of each stroke is defined as the halfway point from pen-down to pen-up; it is not the point whose Y-coordinate is in the middle of the range of Y-coordinates in the stroke.

In step 130, the deviation $d_k$ of the intersection point ($X_k$,$Y_k$) of each stroke k with the point equidistant from the upper and lower points 126 and 128, respectively, is determined as follows, where the upper and lower points are labeled $Ymax_k$ and $Ymin_k$, respectively:

$$d_k = \frac{1}{2} |Ymin_k + Ymax_k - 2(aX_k + b)| \quad (2)$$

A step size D is determined in step 132 which is a fraction (typically half) of the average values of the deviations $d_k$.

In step 134, K alternative base-lines are determined, having the same slope as the center line. These are shown in FIG. 9B. The K base-lines are defined as the center line 124 and K-1 lines 138 of distances which are multiples of D below the center line 124. In step 140, the lines generator 108 generates J size lines above the center line. Each size-line is parallel to the center line and a multiple of D above it. Thus, the K base-lines and the J size-lines form a series of lines parallel to the center line and at intervals of length D from it.

The selector 110 (FIG. 7) loops through the entire set of J×K combinations of size- and base-lines, for the stokes of the character. For each combination of size- and base-lines, the classifier 40 matches the shape and base- and size-line location of the input characters to the reference characters in the database 42. Once the selector 110 has finished looping through the combinations of the size- and base-lines, the decision unit 104 selects the best average match value over the entire set of characters which were matched.

Figure 10:
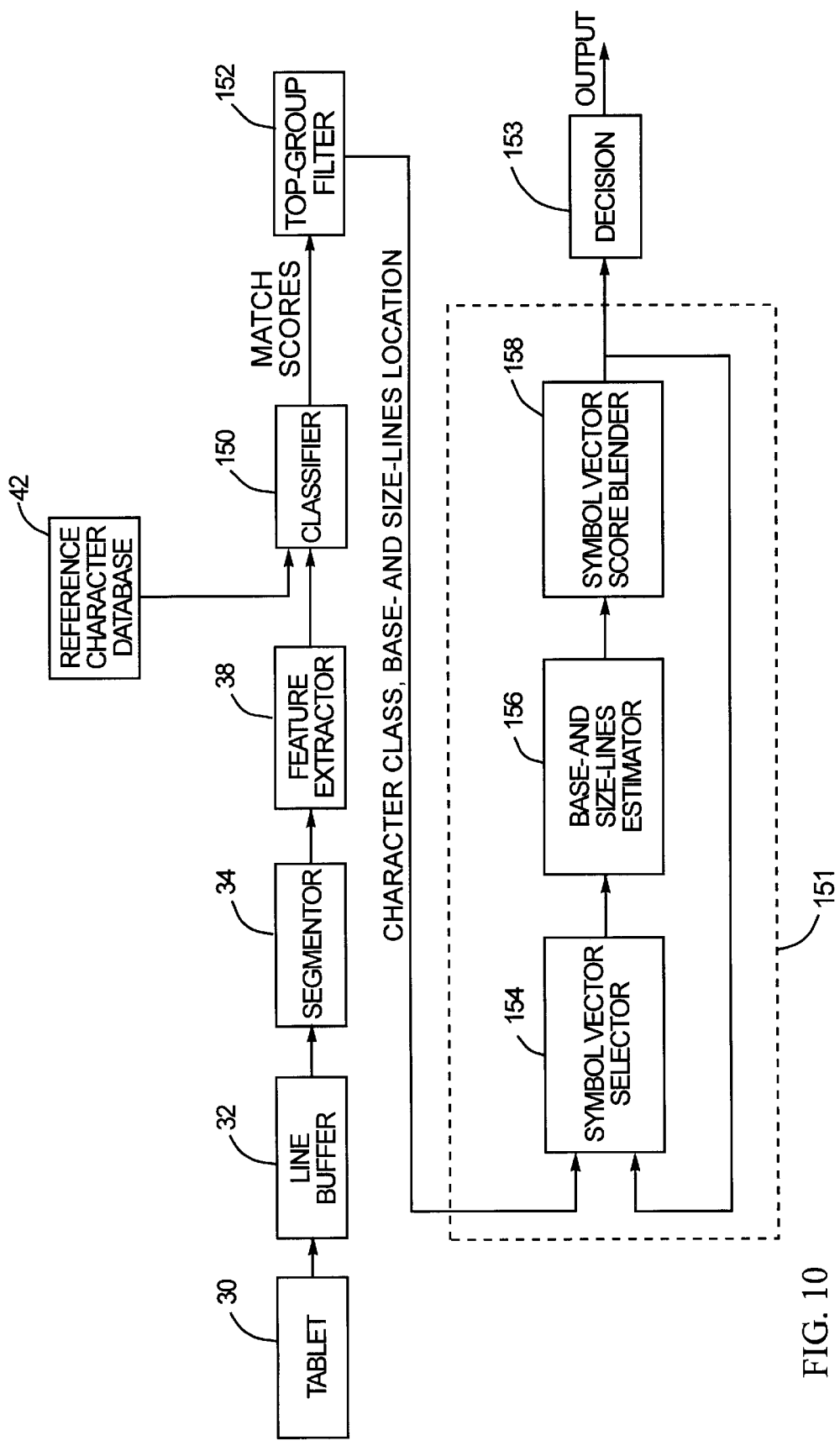
FIG. 10 is a block diagram illustration of a handwriting recognition system having a further alternative reference line estimator, constructed and operative in accordance with a third preferred embodiment of the present invention.

Reference is now made to FIG. 10 which illustrates a further embodiment of the present invention in which the reference line detector is operative after the shape classification.

The embodiment of FIG. 10 comprises the input device 30, the line buffer 32 of FIG. 2, the segmentor 34, the feature extractor 38 and the reference character database 42. It also includes a classifier, labeled 150, a post-shape recognition reference lines estimator 151 and a decision unit 153.

The classifier 150 matches (by producing a match score) the input characters to those of the reference character database 42 in accordance with just the shape of the characters. This is opposed to classifier 40 which also utilizes the reference line matching as part of its match score.

In accordance with this embodiment, the shape match scores are provided to a top-group filter 152 which selects the reference symbols having the top scores, above a certain match value, such as 50 out of 100, for the currently classified input character. Filter 152 also receives, from database 42, the base- and size-line location for each symbol (or reference character) possibly matched to the current input character For example, FIG. 11 illustrates a handwritten script for the words "how are you". Table 1 provides exemplary symbols, their top scores and their base- and size-line locations (as a percentage of the height of the bounding box) for the script of FIG. 11. Each reference character is listed with its match score (s), base-line percentage (b) and size-line percentage (z).

TABLE 1

Matched Characters and their Parameters for the handwritten "how are you"

| h | o | w | a | r | e | y | o | u |
|---|---|---|---|---|---|---|---|---|
| n | o | W | u | v | e | y | o | o |
| s = 81 | s = 90 | s = 90 | s = 77 | s = 83 | s = 81 | s = 74 | s = 84 | s = 77 |
| b = 5 | b = 6 | b = 3 | b = 15 | b = 10 | b = 8 | b = 36 | b = 6 | b = 6 |
| z = 92 | z = 96 | z = 57 | z = 93 | z = 98 | z = 98 | z = 92 | z = 96 | z = 96 |
| h | O | w | a | r | l | 9 | O | v |
| s = 78 | s = 88 | s = 85 | s = 71 | s = 78 | s = 74 | s = 68 | s = 80 | s = 72 |
| b = 2 | b = 6 | b = 3 | b = 17 | b = 2 | b = 17 | b = 5 | b = 6 | b = 10 |
| z = 67 | z = 60 | z = 95 | z = 98 | z = 94 | z = 67 | z = 87 | z = 60 | z = 94 |
| b |  |  | n |  | c | g |  | u |
| s = 59 |  |  | s = 55 |  | s = 69 | s = 58 |  | s = 69 |
| b = 3 |  |  | b = 5 |  | b = 1 | b = 41 |  | b = 15 |
| z = 76 |  |  | z = 92 |  | z = 98 | z = 97 |  | z = 93 |

For each combination of reference characters, the reference lines estimator 151 generates base- and size-lines from the locations of the base- and size-lines of the selected reference characters. To that end, the reference lines estimator 151 comprises a symbol vector selector 154, a base- and size-lines estimator 156 and a symbol vector score blender 158.

The symbol vector selector 154 stores the possible symbols for each handwritten character of the line, until the line is finished. For each new handwritten character, the selector 154 selects a plurality of vectors of symbols from among the symbols it has stored. Thus, if "w" is the third character, the selector 154 will alternately select "noW", "now", "hoW", "how", "boW", "bow", "nOW", "nOw", "hOW", "hOw", "bOW", "bOw".

Estimator 156 receives the currently selected vector of symbols and the base- and size-line heights (percentages) of each symbol therein. Estimator 156 generates the equation of lines which best pass through the base-line positions and through the size-line positions of the vector of symbols. Typically, estimator 156 utilizes the median line estimation method described hereinabove in FIG. 6 with respect to groups of extremum points.

For each vector of symbols, score blender 158 determines an average score, based on the shape, base and size scores, for all the characters in the line buffer 32.

Decision unit 153 receives the output of the score blender 158 for each symbol vector and selects the symbol vector having the best score by some metric.

It will be appreciated by persons skilled in the art that the present invention is not limited to what has been particularly shown and described hereinabove. Rather the scope of the present invention is defined by the claims which follow:

We claim:

1. A handwritten character recognizing system which includes estimation of reference lines, the system comprising:
   a stroke buffer for storing a plurality of consecutive strokes of input characters, wherein each stroke has a multiplicity of sample points, said characters having reference lines associated therewith, each said reference line being of a type, each said type from a collection of a plurality of reference line types;
   a feature extractor for forming input characters from said strokes and for producing shape information for each input character formed;
   a reference lines estimator, connected to said stroke buffer, for producing a plurality of sets of reference lines all of which are parallel to a central line estimated from a central sample point of each stroke, each said set of reference lines containing one and only one reference line of every said type of said collection;
   a reference character database comprising a multiplicity of reference characters, wherein, for each reference character, said database lists its shape information and reference line measurements indicating how reference lines pass through it;
   a character classifier for matching said reference characters to said input characters in accordance with said shape information, for matching a set of said reference line measurements to each set of reference lines and for producing scores thereby; and
   a decision unit for classifying said input characters based on said scores produced by said character classifier.

2. A system according to claim 1 and wherein said reference lines estimator comprises means for receiving said strokes, means for estimating a central line from a set of central sample points of said strokes, and means for producing, from said central line, said plurality of possible reference lines which are parallel to but at a distance from said central line.

3. A system according to claim 1 and wherein said reference line measurements are percentages of a height of a bounding box which bounds each reference character.

4. A handwritten character recognizing system which includes estimation of reference lines, the system comprising:
   a line buffer for storing a line having a plurality of input characters therein;
   a feature extractor for producing shape information for each input character in said line buffer;
   a reference character database comprising a multiplicity of reference characters, wherein, for each reference character, said database lists its shape information and reference line measurements indicating how reference lines pass through it;
   a character classifier for matching said reference characters to said input characters in accordance with said shape information and for producing scores thereby;
   a top score filter for selecting those reference characters having scores above a predetermined threshold and for receiving said reference line measurements for each selected reference character,
   a reference lines estimator, connected to said top score filter, for generating reference lines from said reference line measurements of said selected reference characters, wherein one set of reference lines is produced for each combination of selected reference characters, and for producing a score for each set of reference lines; and
   a decision unit for classifying said line of input characters based on the best score, for said line, produced by said reference lines estimator.

5. A system according to claim 4 and wherein said reference line measurements are percentages of a height of a bounding box which bounds each reference character.

6. A method for recognizing handwritten characters which includes estimation of reference lines, the method comprising the steps of:
   in a stroke buffer, storing a plurality of consecutive strokes of input characters, wherein each stroke has a multiplicity of sample points, said characters, having reference lines associated therewith, each said reference line being of a type, each said type from a collection of a plurality of reference line types;
   forming input characters from said strokes and producing shape information for each input character formed;
   producing a plurality of sets of reference lines all of which are parallel to a central line estimated from a central sample point of each stroke;
   storing, in a reference character database, a multiplicity of reference characters, wherein, for each reference character, said database lists its shape information and reference line measurements indicating how reference lines pass through it;
   matching said reference characters to said input characters in accordance with said shape information;
   matching a set of said reference line measurements to each set of reference lines and for producing scores thereby, each said set of reference lines containing one and only one reference line of every said type of said collection; and
   classifying said input characters based on said scores produced by said step of matching.

7. A method according to claim 6 and wherein said step of producing comprises the steps of receiving said strokes, estimating a central line from a set of central sample points of said strokes, and producing, from said central line, said plurality of possible reference lines which are parallel to but at a distance from said central line.

8. A method according to claim 6 and wherein said reference line measurements are percentages of a height of a bounding box which bounds each reference character.

9. A method for recognizing handwritten characters which includes estimation of reference lines, the method comprising the steps of:
   storing, in a line buffer, a line having a plurality of input characters therein;
   producing shape information for each input character in said line buffer;

storing, in a reference character database, a multiplicity of reference characters, wherein, for each reference character, said database lists its shape information and reference line measurements indicating how reference lines pass through it;

matching said reference characters to said input characters in accordance with said shape information and producing scores thereby;

selecting those reference characters having scores above a predetermined threshold and receiving said reference line measurements for each selected reference character;

generating reference lines from said reference line measurements of said selected reference characters, wherein one set of reference lines is produced for each combination of selected reference characters, and producing a score for each set of reference lines; and classifying said line of input characters based on the best score, for said line, produced by said reference lines estimator.

10. A method according to claim 9 and wherein said reference line measurements are percentages of a height of a bounding box which bounds each reference character.

* * * * *